(12) United States Patent
Seth et al.

(10) Patent No.: US 11,720,807 B2
(45) Date of Patent: Aug. 8, 2023

(54) MACHINE LEARNING TO TUNE PROBABILISTIC MATCHING IN ENTITY RESOLUTION SYSTEMS

(71) Applicant: International Business Machines Corporation, Armonk, NY (US)

(72) Inventors: Abhishek Seth, Deoband (IN); James Albert O'Neill, Jr., Austin, TX (US); Scott Schumacher, Porter Ranch, CA (US); Soma Shekar Naganna, Bangalore (IN); Mohammad Khatibi, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 16/808,957

(22) Filed: Mar. 4, 2020

(65) Prior Publication Data

US 2021/0279604 A1 Sep. 9, 2021

(51) Int. Cl.
*G06F 16/2455* (2019.01)
*G06F 16/215* (2019.01)
*G06N 5/04* (2023.01)
*G06N 20/00* (2019.01)
*G06Q 10/10* (2023.01)

(52) U.S. Cl.
CPC ............. *G06N 5/04* (2013.01); *G06F 16/215* (2019.01); *G06F 16/24556* (2019.01); *G06N 20/00* (2019.01); *G06Q 10/10* (2013.01)

(58) Field of Classification Search
CPC ........ G06N 5/04; G06N 20/00; G06F 16/215; G06F 16/24556; G06Q 10/10
See application file for complete search history.

(56) References Cited

U.S. PATENT DOCUMENTS

| | | | |
|---|---|---|---|
| 9,552,412 B1* | 1/2017 | Lowe | G06F 16/3325 |
| 11,372,900 B1* | 6/2022 | Guo | G06F 16/248 |
| 11,514,528 B1* | 11/2022 | Ciliberti | G06N 20/00 |
| 2005/0049987 A1* | 3/2005 | Meek | G06Q 30/02 |
| | | | 706/50 |
| 2010/0175024 A1 | 7/2010 | Schumacher et al. | |
| 2016/0357790 A1 | 12/2016 | Elkington et al. | |
| 2017/0053002 A1 | 2/2017 | Bowman et al. | |
| 2017/0262445 A1* | 9/2017 | Jeon | H04L 67/306 |
| 2019/0079937 A1* | 3/2019 | Manning | G06F 16/24578 |
| 2019/0188200 A1* | 6/2019 | Erenrich | G06F 16/24558 |
| 2019/0213167 A1 | 7/2019 | Bettencourt da Silva et al. | |
| 2019/0213407 A1* | 7/2019 | Toivanen | G06F 40/30 |
| 2019/0215574 A1* | 7/2019 | Saxena | G06V 20/30 |

(Continued)

OTHER PUBLICATIONS

John N. Dvorak, "Biographic Entity Resolution," Global Identity Summit, Sep. 16, 2014, 20 pages.

*Primary Examiner* — Cam Y T Truong
(74) *Attorney, Agent, or Firm* — Patterson + Sheridan, LLP

(57) ABSTRACT

Techniques for data evaluation are provided. A plurality of data records is received, and a first comparison vector is generated by comparing a first and a second data record of the plurality of data records, where the first comparison vector indicates differences between the first and second data records. A machine learning model is trained based at least in part on the first comparison vector. The plurality of data records is evaluated using the machine learning model, and at least two of the plurality of data records are linked based on the evaluation.

20 Claims, 6 Drawing Sheets

(56) References Cited

U.S. PATENT DOCUMENTS

| | | | |
|---|---|---|---|
| 2020/0349136 A1* | 11/2020 | Yan | G06N 7/005 |
| 2021/0240834 A1* | 8/2021 | Trabelsi | G06N 3/08 |
| 2021/0342211 A1* | 11/2021 | Melo | G06F 11/079 |
| 2022/0138238 A1* | 5/2022 | Rege | G06F 16/9014 |
| | | | 707/737 |

* cited by examiner

MACHINE LEARNING TO TUNE PROBABILISTIC MATCHING IN ENTITY RESOLUTION SYSTEMS

BACKGROUND

The present disclosure relates to data management, and more specifically, to tuning entity resolution systems using machine learning.

Data management solutions generally work with enterprise data to perform indexing, matching, and linking of data from any number of sources in order to yield a more comprehensive understanding of the data. For example, one data source may include data relating to customer birthdays, while another includes data about customer purchase history. To link the data, the data management system must evaluate the data from the disparate sources and determine which records should be linked. This matching process requires comparing different record attributes (e.g. name, address, date of birth, unique identifiers, and the like) for each pair of records in order to determine if they match (e.g., refer to the same entity), and should therefore be linked. Some existing systems utilize a series of mathematically-derived statistical probabilities and complex weight tables. Using statistically defined thresholds, pairs of records can be considered as matched or unmatched.

SUMMARY

According to one embodiment of the present disclosure, a method is provided. The method includes receiving a plurality of data records, and generating a first comparison vector by comparing a first and a second data record of the plurality of data records, wherein the first comparison vector indicates differences between the first and second data records. The method further includes training a machine learning model based at least in part on the first comparison vector. Additionally, the method includes evaluating the plurality of data records using the machine learning model, and linking at least two of the plurality of data records based on the evaluation.

According to a second embodiment of the present disclosure, a computer program product is provided. The compute program product comprises one or more computer-readable storage media collectively containing computer-readable program code that, when executed by operation of one or more computer processors, performs an operation. The operation includes receiving a plurality of data records, and generating a first comparison vector by comparing a first and a second data record of the plurality of data records, wherein the first comparison vector indicates differences between the first and second data records. The operation further includes training a machine learning model based at least in part on the first comparison vector. Additionally, the operation includes evaluating the plurality of data records using the machine learning model, and linking at least two of the plurality of data records based on the evaluation.

According to a third embodiment of the present disclosure, a system is provided. The system includes one or more computer processors, and one or more memories collectively containing one or more programs which, when executed by the one or more computer processors, performs an operation. The operation includes receiving a plurality of data records, and generating a first comparison vector by comparing a first and a second data record of the plurality of data records, wherein the first comparison vector indicates differences between the first and second data records. The operation further includes training a machine learning model based at least in part on the first comparison vector. Additionally, the operation includes evaluating the plurality of data records using the machine learning model, and linking at least two of the plurality of data records based on the evaluation.

DETAILED DESCRIPTION

Figure 1:
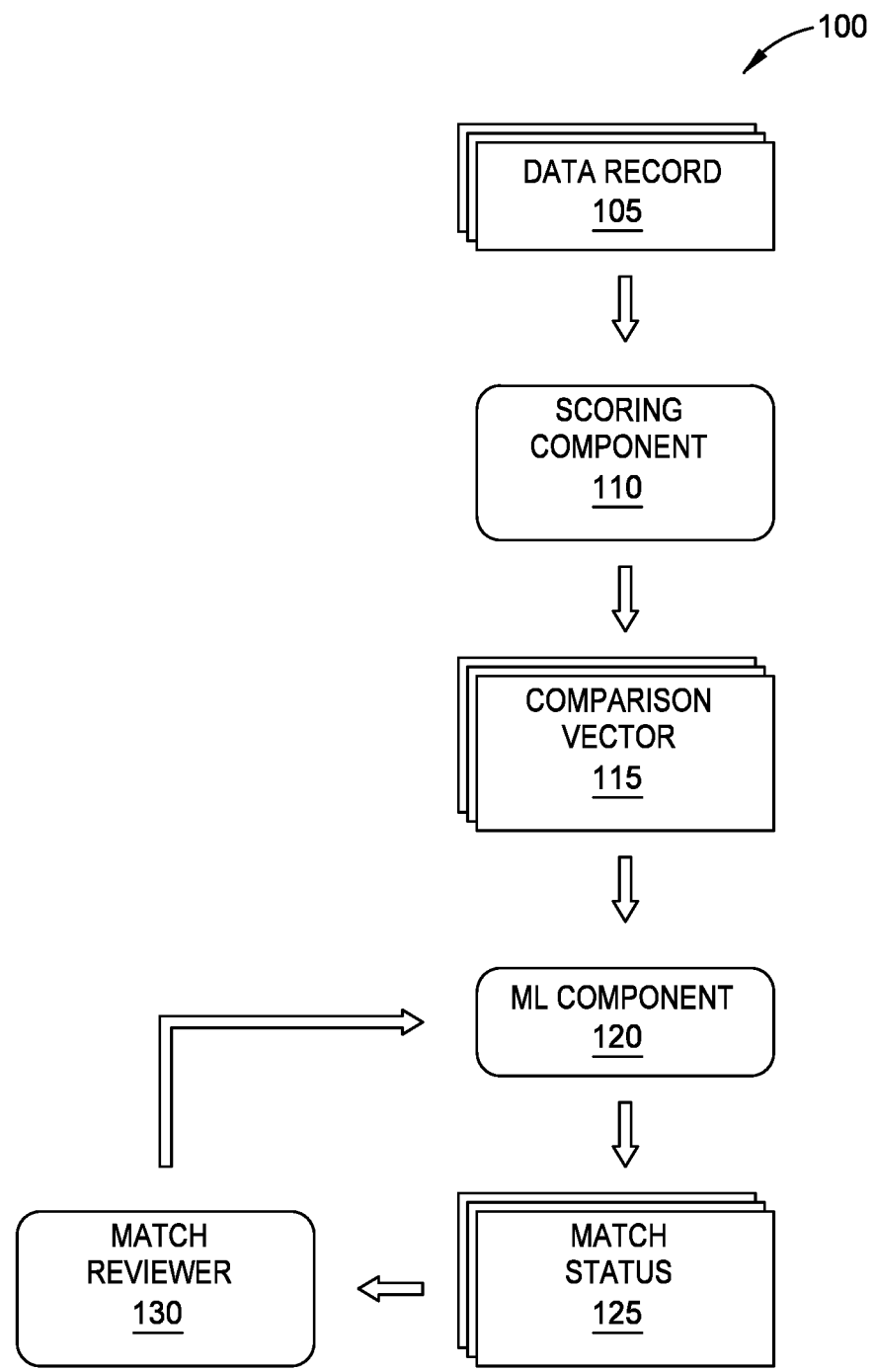
FIG. 1 depicts a workflow for evaluating data records and using machine learning to perform entity resolution, according to one embodiment disclosed herein.

Embodiments of the present disclosure provide techniques for improved entity resolution that reduces manual effort, improves accuracy, and reduces resources required to perform the resolution. Probabilistic matching is a complex statistical process that has provided industry leading accuracy. However, existing systems involve a large number of important tradeoffs, including significant reliance on expert users or consultants to configure hundreds of algorithm parameters, the need for extensive statistical analysis to generate custom weighted scoring designed for the unique characteristics of each dataset, and the fact that measuring customer linking pattern preference is a manual and iterative process. Many existing systems require an expert to tune the system, generate sample pairs, manually review those sample pairs, tune of the probabilistic configuration based on feedback, generate additional sample pairs, and repeat this process until the configuration yields the desired linking patterns. Further, tuning more complex multi-dimensional comparison functions (e.g. agreement on both address and phone number, or detecting false positives such as a father and son at the same address) is extremely complex.

Embodiments of the present disclosure provide techniques to apply machine learning (ML) to entity resolution, in order to significantly improve results. In some embodiments of the present disclosure, attribute comparison functions check for a variety of matching conditions including exact match, edit distance, n-gram techniques, phonetic approaches, and/or partial matching. Scores and/or vectors can be generated based on the outcome of these comparisons, and sub-scores from each attribute may be combined based on statistically determined relative weights.

Some embodiments of the present disclosure provide a feature vector representation for comparisons of record pair attributes. These feature vectors, combined with statistical scores and direct user feedback on ML-selected vector patterns of interest, can be used to improve matching and/or to tune underlying probabilistic configuration parameters, which dramatically simplifies configuration and reduces the time to value by converging faster on user linking preferences.

In at least one embodiment, the system initially begins with a default configuration for record matching (e.g., default weights and parameters), and generates sample pairs using the default configuration to score record comparisons. For each pair of records, the system can generate a feature vector for the comparison, along with this matching score. In an embodiment, one or more ML models can then be trained using these feature vectors and the accompanying scores/labels (e.g., matched, unmatched, or needing further review). In some embodiments, user input (e.g., indicating whether a given pair should be linked) can also be used to tune and refine the ML model(s). In an embodiment, retraining the ML model(s) can in turn tune the configuration parameters (e.g., statistical weights) used to determine match status. For example, in some embodiments, the matching status is based on the overall score and that overall score is aggregation of attribute-wise scores. Those attribute wise scores in turn depend on the statistical weights of the system (which, in some embodiments, begin with default values). In an embodiment, based on the user feedback, the ML model can retrain itself, which causes those statistical weights to be tweaked as well. This process can be repeated autonomously until the match patterns are acceptable.

FIG. 1 depicts a workflow 100 for evaluating data records and using machine learning to perform entity resolution, according to one embodiment disclosed herein. In the illustrated embodiment, Data Records 105 are initially provided to a Scoring Component 110. In embodiments, the Data Records 105 can generally include any data from any number of sources. For example, the Data Records 105 may include data for a variety of individual users and/or customers, and stored in a variety of data sources. Continuing this example, a first database may store indications of items purchased by each user, while a second stores contact information for users. In embodiments, a single user may have any number of corresponding Data Records 105, provided by any number of sources. However, there is typically no easy way to link or match these records.

For example, if each Data Record 105 is complete (with no missing values) and entirely accurate, it may be possible to link Data Records 105 with exactly-matching attributes (e.g., identical names, addresses, identifiers, phone numbers, and so on). However, in realistic data sets, many of the Data Records 105 are incomplete (e.g., with a value for name and address, but no phone number or identifier). This yields uncertainty when matching records. Further, inaccuracies in a record can be caused by a variety of common factors, including mistyping, errors in optical character recognition (ORC) and/or speech recognition, lack of attention by the user entering the data, and the like. These inaccuracies can further complicate the matching process.

Each Data Record 105 can include one or more values for any number of attributes. For example, for a "name" attribute, the corresponding value provided in a Data Record 105 may be "John Doe." In embodiments, each Data Record 105 may or may not provide a value for any given attribute. Additionally, the particular formatting used for a given attribute may differ across Data Records 105, particularly if the records were collected from different sources. For example, one Data Record 105 may define a field as "date of birth," while another labels it "birthday" and still another labels it "DOB." Similarly, in formatting the value for the date of birth attribute, one Data Record 105 may use a month/day/year format (e.g., mm/dd/yyyy), while another uses day/month/year (dd/mm/yyyy), and still another uses prose text (e.g., Jan. 6, 1980). Although not depicted in the illustrated embodiment, some embodiments of the entity resolution system provide normalization of these elements to ensure the attributes of each Data Record 105 are appropriately compared.

In the illustrated embodiment, the Scoring Component 110 evaluates the Data Records 105 to generate Comparison Vectors 115 for each pair of Data Records 105. Each Comparison Vector 115 is a feature vector indicating the differences between a given pair of Data Records 105. In some embodiments, the Comparison Vectors 115 provide numerical values for a variety of dimensions of comparison, across any number of attributes. For example, for a "name" attribute, the corresponding section of the feature vector may indicate whether the corresponding Data Records 105 are an exact match (e.g., using a Boolean value of zero or one) and/are within a predefined edit distance, as well as a value indicating the edit distance between them. Generally, the Comparison Vectors 115 are quantifiable and objective indications of the distances between any pair of records. Comparison Vectors 115 are described in more detail below, with reference to FIG. 2.

In some embodiments, the Scoring Component 110 also generates one or more comparison scores for each pair of Data Records 105. For example, the Scoring Component 110 may use one or more default configurations to score and weight various attributes in each record, in order to generate an overall matching score. In many existing systems, this score is used to determine whether the records are matched (e.g., by comparing the scores to one or more thresholds) and should therefore be linked. In some embodiments, this score is included as part of the Comparison Vector 115.

As illustrated, these Comparison Vectors 115 are provided to an ML Component 120, which evaluates them to generate a Match Status 125 for each pair of Data Records 105. The Match Status 125 generally indicates whether the corresponding records are matched and should therefore be linked, connected, or otherwise aggregated together. For example, if two Data Records 105 include information relating to the same individual, in some embodiments, the Data Records 105 are matched and should be linked/combined. This provides a more complex and complete set of information for the individual.

In some embodiments, the ML Component 120 determines the Match Statuses 125 by evaluating the Comparison Vectors 115 using one or more trained ML models. In one embodiment, the ML Component 120 first trains and/or refines the ML models using labeled training data. The labeled data may include, for each exemplar training pair of Data Records 105, a corresponding Comparison Vector 115, a match score, and/or a match label. In one embodiment, the match label is generated by comparing the match score (e.g., generated using a predefined default configuration) and one or more predefined (default) thresholds. In another embodiment, a user can manually label the pairs as matched or unmatched.

In an embodiment, the ML Component 120 can then iteratively refine the ML models by using the Comparison Vector 115 as input, and applying the match label as the target output. Using backpropagation, the ML Component 120 can then refine the internal weights and/or parameters of the ML model(s). In at least one embodiment, the ML Component 120 uses the models to refine and tune the parameters of the matching algorithm(s), such as the weights of each respective attribute/feature, and/or the matching thresholds, to improve the match scores and labels.

As illustrated, some or all of the Match Statuses 125 can be provided to a Match Reviewer 130 (e.g., a subject matter expert) for review. The user's feedback on these Match Statuses 125 can then be provided to the ML Component 120 to refine the ML models. In an embodiment, the feedback can include a simple indication as to whether the Match Status 125 for a given pair of Data Records 105 is correct. This is in contrast to existing systems, which typically require the user to manually tune the configuration itself in an attempt to yield more accurate results. Advantageously, embodiments of the present disclosure allow the ML Component 120 to perform this complex analysis automatically. That is, the user need only specify whether the Data Records 105 should be matched, and need not tweak individual matching parameters in an effort to yield the correct Match Status 125.

In embodiments, this iterative process can be repeated any number of times. In one embodiment, the process repeats until the Match Reviewer 130 (or other user/customer) is satisfied with the accuracy of the Match Statuses 125. This can be indicated explicitly by the user, and/or inferred by the number or percentage of Match Statuses 125 that are accepted and rejected. Once the user is satisfied, the model (s) can be deployed and used to link Data Records 105 in production.

Figure 2:
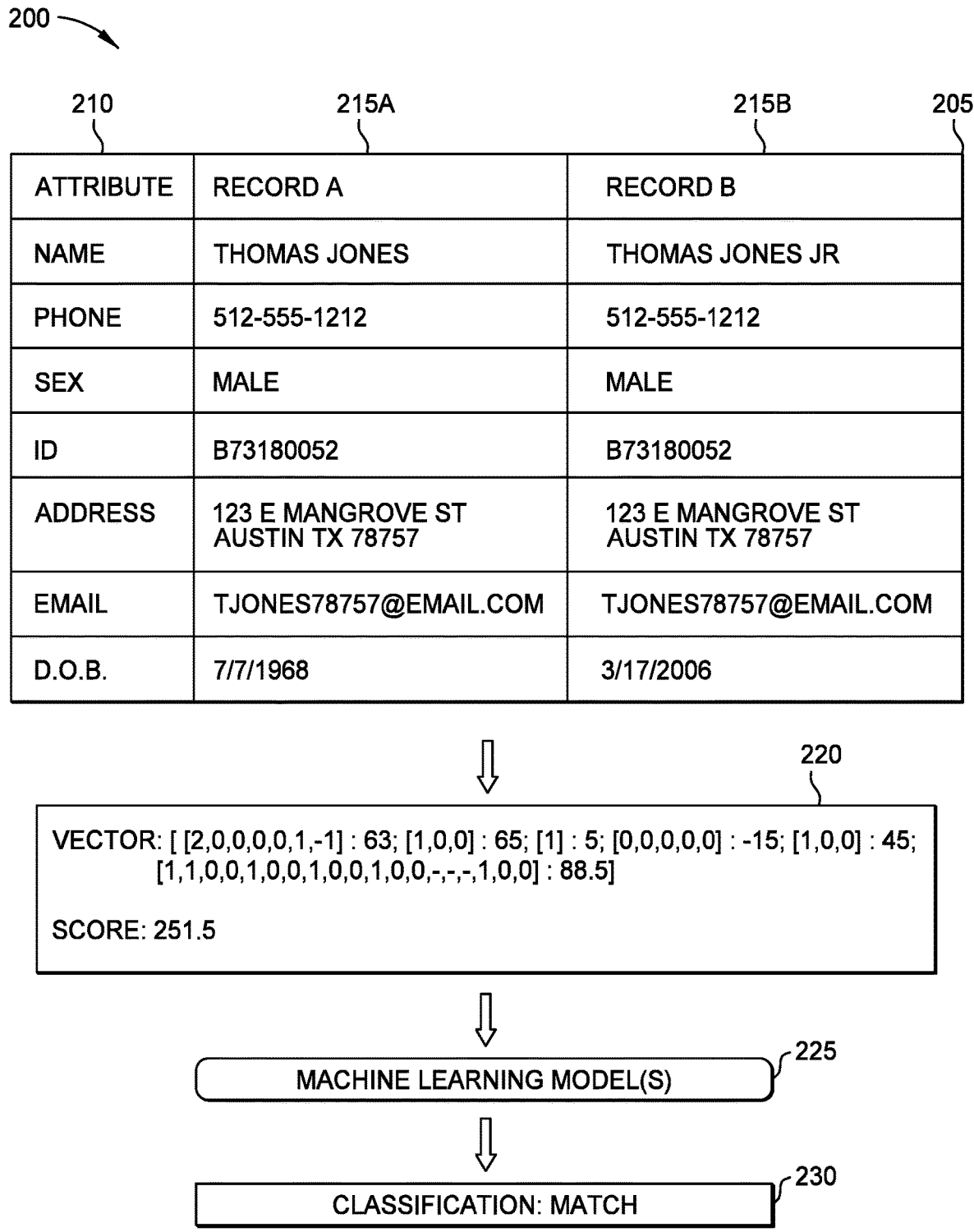
FIG. 2 depicts a workflow to generate feature vectors in order to evaluate data records using matching configurations and machine learning, according to one embodiment disclosed herein.

FIG. 2 depicts a workflow 200 to generate feature vectors in order to evaluate data records using matching configurations and machine learning, according to one embodiment disclosed herein. In the illustrated embodiment, a Table 205 indicates a number of Attributes 210, as well as corresponding attribute values for two Records 215A and 215B. In the illustrated embodiment, the first Record 215A indicates a name of "Thomas Jones," a phone number of "512-555-1212," a sex of "Male," an identifier of "B73180052," a physical address of "123 E Mangrove St Austin Tex. 78757," an email of "tjones78757@email.com," and a date of birth of "Jul. 7, 1968." Further, the Records 215B indicates a name of "Thomas Jones Jr," a phone number of "512-555-1212," a sex of "Male," an identifier of "B73180052," a physical address of "123 E Mangrove St Austin Tex. 78757," an email of "tjones78757@email.com," and a date of birth of "Mar. 17, 2006."

In the illustrated embodiment, a Feature Vector 220 (also referred to as a Comparison Vector 115) is generated to reflect the distance between the Records 215. For each respective attribute, the Feature Vector 220 represents the attribute's comparison details. In embodiments, the Feature Vector 220 can incorporate a variety of internal comparison details for each attribute, such as whether the attribute is an exact match, a nickname match, and/or a phonetic match, the edit distance between the attribute values, and the like. In embodiments, for each attribute, there can be vastly different types of similarity checks which are performed. Thus, the resulting Feature Vectors 220 can also carry different details and are of different dimensions, as needed. A discussed above, in some embodiments, the Feature Vector 220 further includes one or more scores generated by a probabilistic matching engine running a default configuration.

In embodiments, the system considers different aspects of each Attribute 210 when generating the Feature Vector 220. In an embodiment, for the "Name" Attribute 210, the corresponding vector (or portion of the Feature Vector 220) is defined based on exact match, nicknames, phonetic equivalents, edit distance, and generation values. In one embodiment, for two names, each having any number of tokens (e.g., characters/words), the corresponding vector $V_{name}$ can be defined along seven dimensions: (1) the number of tokens that are an exact match, (2) the number of tokens that are an edit match, (3) the number of tokens that are a nickname match, (4) the number of tokens that do not match, (5) the number of initials that match, (6) the number of missing tokens between the records, and (7) the generation code.

In the illustrated embodiment, the number of tokens that exactly match refers to whether the first name, last name, and any other tokens match exactly. The number of tokens that are an edit match includes tokens (e.g., the first name) that are within a predefined edit distance (e.g., three). In an embodiment, the nickname match utilizes a predefined set of associated nicknames (such as "Bob" and "Robert") to determine whether given tokens are a nickname match. The number of tokens that do not match is defined as tokens with an edit distance exceeding a predefined threshold. Checking for initial match includes comparing the first character of each token for an exact match. The number of missing tokens indicates the number of tokens present in one record but absent from the other. Finally, the generation code refers to any suffix present (e.g., Junior, Jr., Senior, Sr., and the like).

As illustrated, for the Records 215A and 215B with names "Thomas Jones" and "Thomas Jones Jr," the $V_{name}$ is [2, 0, 0, 0, 0, 1, −1]. That is, two tokens exactly match (e.g., "Thomas" and "Jones"), zero tokens are an edit match (because they are exactly matched), zero tokens are a nickname match (because they are an exact match), zero tokens are unmatched, the initials do not match (because of the "Jr" suffix), one token is missing (the "Jr" token is missing from the first Record 215A), and the generation code is "−1." In the illustrated embodiment, the portion of the Feature Vector 220 corresponding to the "name" Attribute 210 is further associated with a score of 63, which is generated using a default configuration of the scoring/probabilistic matching engine.

In embodiments, the "identifier" Attribute 210 corresponds to any identifier of the individual, including social security number, passport number, customer number, and the like. In an embodiment, the system generally defines the ID vector based on exact match and edit distance. In one embodiment, for two identifiers, the corresponding vector $V_{ID}$ can be defined along three dimensions: (1) a Boolean value indicating whether the identifiers are an exact match, (2) a Boolean value indicating whether the edit distance between the identifiers is less than a predefined threshold (e.g., less than or equal to two), and (3) a Boolean value indicating whether the identifiers are unmatched (e.g., with an edit distance greater than the defined threshold).

As illustrated, for the Records 215A and 215B, both with identifier "B73180052," the $V_{ID}$ is [1, 0, 0]. That is, the identifiers are an exact match (rather than an edit distance match). In the illustrated embodiment, the portion of the Feature Vector 220 corresponding to the "identifier" Attribute 210 is further associated with a score of 65, which is generated using a default configuration of the scoring/probabilistic matching engine.

In an embodiment, the vector for the "sex" Attribute 210 is generally defined based on exact match. In one embodiment, for two records, the corresponding vector $V_{sex}$ can be as a single dimension: a Boolean value indicating whether the values are matched. As illustrated, for the Records 215A and 215B, both with sex of "male," the $V_{sex}$ is [1]. That is, the values are an exact match. In the illustrated embodiment, the portion of the Feature Vector 220 corresponding to the "sex" Attribute 210 is further associated with a score of 5, which is generated using a default configuration of the scoring/probabilistic matching engine.

In an embodiment, for the "date of birth" Attribute 210 (or other date attribute), the corresponding vector (or portion of the Feature Vector 220) is defined based on exact match, whether only the year matches, whether the year and month both match, whether the year matches but the month and day are transposed, and the like. In one embodiment, for two dates, the corresponding vector $V_{date}$ can be defined along five dimensions: (1) a Boolean value indicating whether the dates are fully matched, (2) a Boolean value indicating whether only the year matches, (3) a Boolean value indicating whether only the year and month match (e.g., with a mismatched day), (4) a Boolean value indicating whether the month and day match (e.g., with mismatched or missing year), and (5) a Boolean value indicating whether the dates are an exact match, but-for a transposed month and day value.

As illustrated, for the Records 215A and 215B with birthdates "7/7/1968" and "3/17/2006," the $V_{date}$ is [0, 0, 0, 0, 0]. That is, the dates are not an exact match, the year is not the only match, the year/month combination is not the only match, the month/day combination is not the only match, and the dates do not match but-for a transposed month/day. In the illustrated embodiment, the portion of the Feature Vector 220 corresponding to the "date" Attribute 210 is further associated with a score of −15, which is generated using a default configuration of the scoring/probabilistic matching engine.

In an embodiment, for the "email" Attribute 210, the corresponding vector (or portion of the Feature Vector 220) is defined based on exact match, partial match, and non-match. In one embodiment, for two emails, the corresponding vector $V_{email}$ can be defined along three dimensions: (1) a Boolean value indicating whether the emails are exactly matched, (2) a Boolean value indicating whether the edit distance between the emails is less than a predefined threshold (e.g., less than or equal to three), and (3) a Boolean value indicating whether the emails are unmatched (e.g., with an edit distance greater than the defined threshold.

As illustrated, for the Records 215A and 215B, both with email "tjones78757@email.com," the $V_{email}$ is [1, 0, 0]. That is, the emails are an exact match, are not considered an edit match (because they are an exact match) and are not unmatched. In the illustrated embodiment, the portion of the Feature Vector 220 corresponding to the "email" Attribute 210 is further associated with a score of 45, which is generated using a default configuration of the scoring/probabilistic matching engine.

In some embodiments, the "address" attribute 210 and "phone number" Attribute 210 are considered jointly to yield a combined vector $V_{AddrAndPhone}$. The "address" can consist of a street number and name, city, state, country, and/or zip code. In one embodiment, if the zip code is not present, the city and street of each record are compared. Otherwise, in one embodiment, only the street number/name and zip code are compared. In one such embodiment, the zip code requires an exact match and/or edit distance match, while other tokens require exact match, phonetic match, nickname match, and/or edit distance match. Further, in one embodiment, for phone numbers, the system considers the exact match and the edit distance match.

In one embodiment, for two values of an address and a phone number, the corresponding vector $V_{AddrAndPhone}$ can be defined along nineteen dimensions: (1) a Boolean value indicating whether a zip code is present in both records, (2) a Boolean value indicating whether the street number/name is an exact match, (3) a Boolean value indicating whether the street number/name is a partial match (e.g., within a predefined edit distance), (4) a Boolean value indicating whether the street name and/or number are a mismatch (e.g., not within the defined edit distance), (5) a Boolean value indicating whether the zip codes (if present) are an exact match, (6) a Boolean value indicating whether the zip codes (if present) are an edit match (e.g., within a defined edit distance), (7) a Boolean value indicating whether the zip codes (if present) are mismatched (e.g., further than the predefined edit distance), (8) a Boolean value indicating whether the cities are an exact match, (9) a Boolean value indicating whether the cities are a partial match (e.g., within a predefined edit distance), (10) a Boolean value indicating whether the cities are mismatched, (11) a Boolean value indicating whether the states are an exact match, (12) a Boolean value indicating whether the states are a partial match (e.g., within a predefined edit distance), (13) a Boolean value indicating whether the states are mismatched, (14) a Boolean value indicating whether the country is an exact match, (15) a Boolean value indicating whether the country is partially mismatched (e.g., within a predefined edit distance), (16) a Boolean value indicating whether the countries are mismatched, (17) a Boolean value indicating whether the phone number is an exact match, (18) a Boolean value indicating whether the phone numbers are within a predefined edit distance, and (19) a Boolean value indicating whether the phone numbers are mismatched.

As illustrated, for the Records 215A and 215B, both with physical address "123 E Mangrove St Austin Tex. 78757" and phone number "512-555-1212," the $V_{AddrAndPhone}$ is [1, 1, 0, 0, 1, 0, 0, 1, 0, 0, 1, 0, 0, -, -, -, 1, 0, 0]. In the illustrated embodiment, the vector values for the dimensions relating to country are null (indicated as "-") because the Records 215A-B do not specify a value for country. Further, in the illustrated embodiment, the portion of the Feature Vector 220 corresponding to the "address" and "phone" Attributes 210 is further associated with a score of 88.5, which is generated using a default configuration of the scoring/probabilistic matching engine.

In the illustrated embodiment, the Feature Vector 220 is additionally associated with an overall match score of 251.5. In embodiments, this score is similarly generated using a default configuration of the scoring/probabilistic matching engine. For example, in one embodiment, the matching engine aggregates the individual component scores using predefined weighting for each available Attribute 210 in order to generate the overall match score. In some embodiments, this score is compared to predefined thresholds to determine whether the Records 215A and 215B are a match and therefore should be linked.

In the illustrated embodiment, rather than simply relying on the match score, this Feature Vector 220 is then provided to one or more ML Models 225 for evaluation. As discussed above, the ML Models 225 can be trained to evaluate the Feature Vector 220 (which may or may not include evaluating the overall match score and/or the component scores) based on its prior training, in order to generate a Classification 230. In the illustrated embodiment, based on the feature vector, the system has determined that the records are a match.

Note, however, that this classification is a false positive. That is, the entity resolution system has classified the records as matching based on their feature vectors, even though they are not. Specifically, Record 215A appears to refer to a first individual, while Record 215B likely refers to that individual's son. In existing systems, expert users must manually define and configure filters to attempt to identify such false positives. In embodiments of the present disclosure, however, the system can rapidly learn to identify such false positives by itself, based on various patterns it can identify in the feature vectors. Further, in some embodiments, the system can use the ML Model(s) 225 to identify and output a feature pattern indicating aspects of feature vectors that may represent false positives. This pattern can be used to quickly scan all existing pairs that are already classified as matches (or will be classified as matches).

Figure 3:
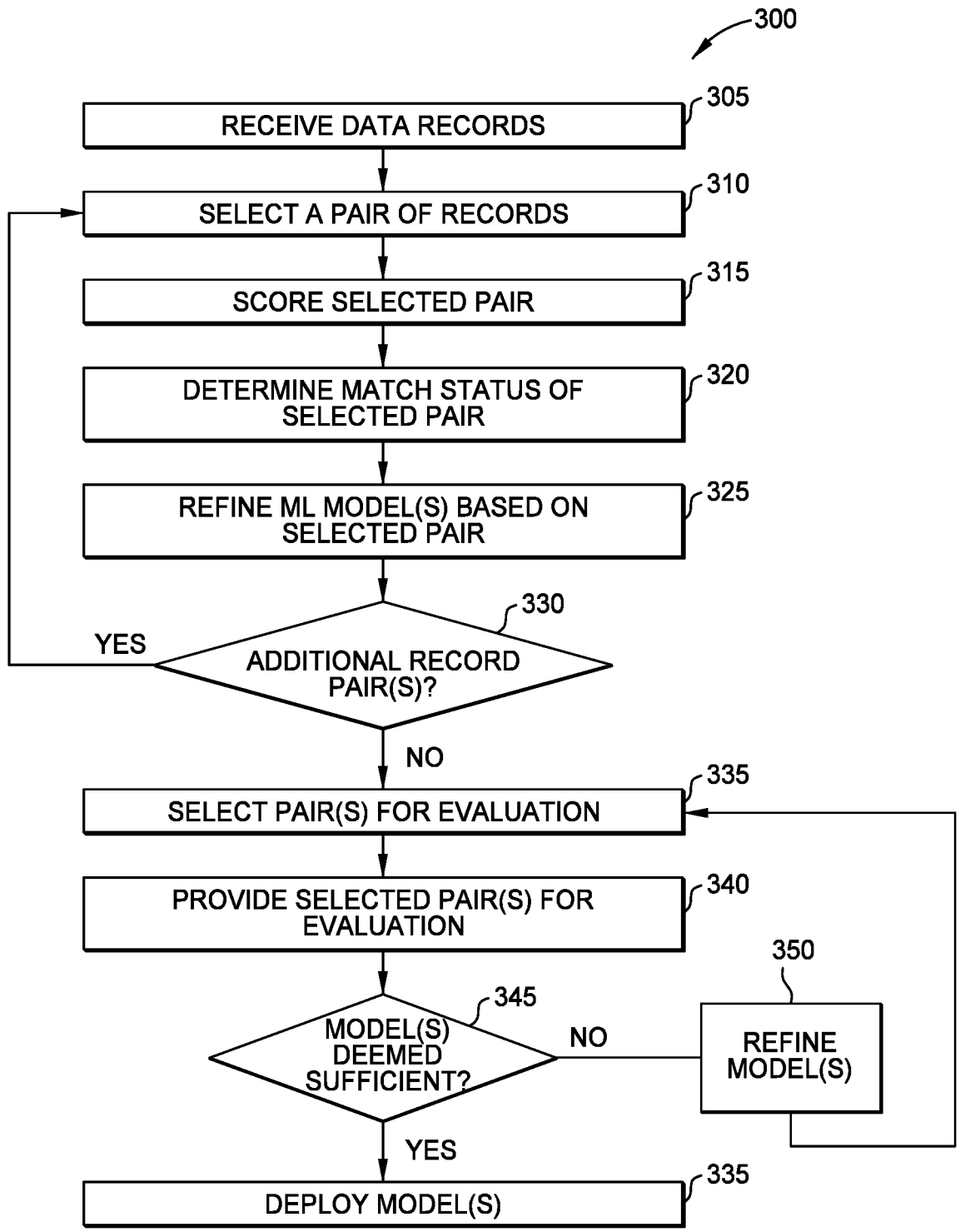
FIG. 3 is a flow diagram illustrating a method for training and refining entity resolution configurations and models, according to one embodiment disclosed herein.

FIG. 3 is a flow diagram illustrating a method 300 for training and refining entity resolution configurations and models, according to one embodiment disclosed herein. The method 300 begins at block 305, where a data management system receives a set of data records during an initial training phase. The data records can include any number of attributes, and be received via any number of data sources. In some embodiments, the data records are generated by splitting user information into multiple data records to facilitate training. That is, in one embodiment, a single data record including information that is known to be linked to a single user can be split into multiple data records. This can facilitate training of the system. For example, because the data is known to be related, the data management system can label the records as matching in order to improve training the system. This reduces the burden on users.

At block 310, the data management system selects a pair of data records. In some embodiments, this can be performed in any suitable fashion (including randomly) until all pairs of data have been evaluated. The method 300 then continues to block 315, where the data management system scores the selected pair of records. In one embodiment, as discussed above, the data management system does so using a default configuration for a probabilistic entity resolution engine. At block 320, the data management system determines the match status of the currently-selected pair of records.

In one embodiment, the data management system does so by referring to a user-provided label. For example, a user may have previously labeled the pair as matching, to facilitate the initial training, or the data management system may prompt a user to label the pattern before proceeding. In another embodiment, the data management system uses the generated match score to determine the match status of the selected pair. For example, the data management system can compare the score to a predefined threshold in order to determine whether the records are linked. Such an embodiment reduces the user effort required to train the system. The method 300 then continues to block 325.

At block 325, the data management system refines the ML model(s) based on the selected pair of records. In one embodiment, as discussed above, this includes generating a feature vector for the comparison. The feature vector can then be used as input, while the determined match status is used as the target output. In this way, the weights and parameters of the ML model(s) can be iteratively refined, in order to better evaluate newly-received records at runtime. The method 300 then continues to block 330, where the data management system determines whether there is at least one additional pair of records that has not yet been evaluated. If so, the method 300 returns to block 310. Otherwise, the method 300 continues to block 335.

At block 335, the data management system selects one or more pairs of data records to be evaluated, in order to determine the accuracy of the trained models. In one embodiment, pairs are selected randomly (or pseudo-randomly). In another embodiment, the data management system can actively drive the refinement process by selecting or suggesting pairs to be evaluated. For example, the ML engine may perform pattern detection over the pairs, and output one or more samples from each identified pattern category. This can ensure that the major variations are manually evaluated. The method 300 then continues to block 340, where the data management system provides the selected pair(s) for evaluation. For example, the data management system may provide the pairs to a user (e.g., a subject matter expert) who can confirm whether the pairs are actually matching or not. Once feedback is received from the user, the method 300 proceeds to block 345, where the data management system determines whether the ML models are sufficient.

In one embodiment, this includes determining whether the user has explicitly indicated that the models are sufficiently accurate and/or are ready for deployment. In some embodiments, this includes determining the percentage of the pairs that were accurately-classified by the model, based on the user feedback. If the models are not sufficiently accurate, the method 300 continues to block 350, where the data management system further refines the models. In one embodiment, this includes using the newly-labeled record pairs to refine the model, as discussed above. That is, the data management system can use the user-provided label as the new correct label for the pair(s) selected at block 335 (or for the subset of these pairs that were incorrectly classified by the system), and refine the model(s) using these new labels.

Advantageously, this allows the data management system to iteratively refine the matching parameters without requiring the user to manually tune the system. That is, the user need not understand why the misclassification occurred or what factors to tune to remedy it. The user need only indicate that the response was incorrect. The data management system can then automatically refine its internal parameters until a satisfactory result is achieved.

Returning to block 345, if the data management system determines that the model is sufficient, the method 300 continues to block 355. At block 355, the data management system deploys the model(s) for use in runtime. At that stage, data records can be received and evaluated by the model(s) to identify matching records, without requiring user oversight.

Figure 4:
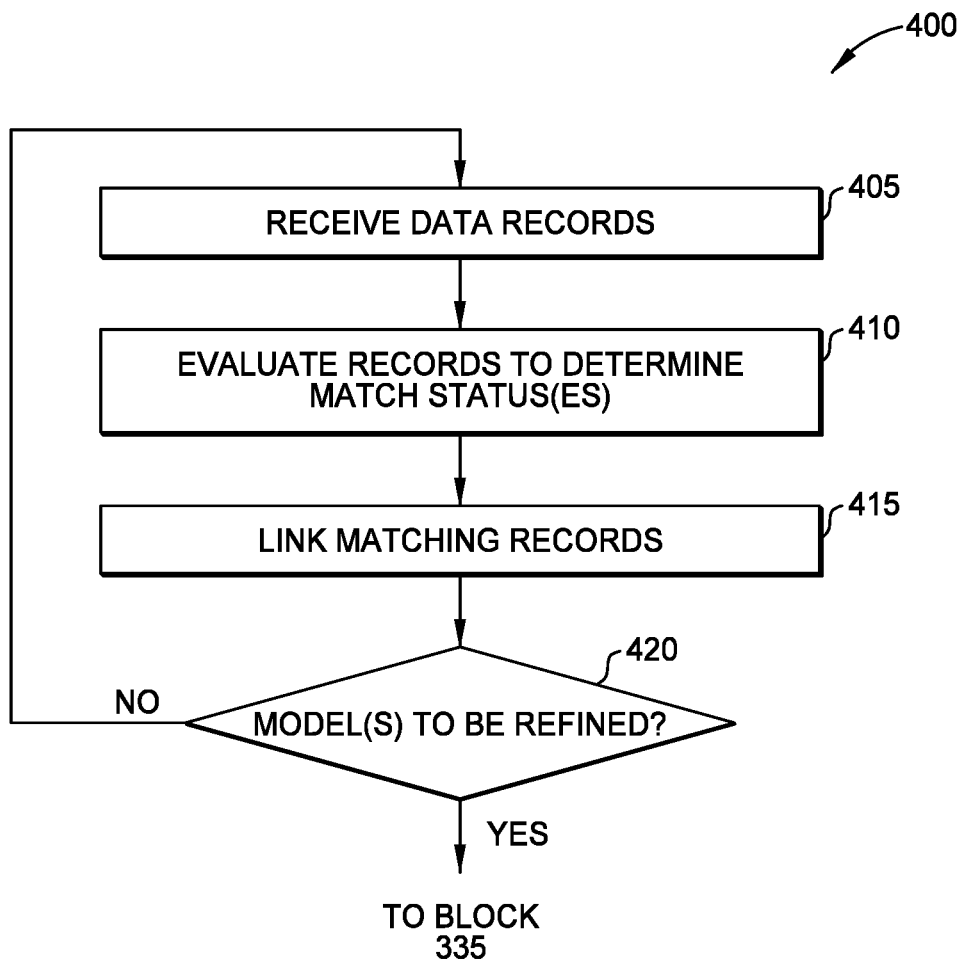
FIG. 4 is a flow diagram illustrating a method for utilizing trained and optimized models to perform entity resolution in data management systems, according to one embodiment disclosed herein.

FIG. 4 is a flow diagram illustrating a method 400 for utilizing trained and optimized models to perform entity resolution in data management systems, according to one embodiment disclosed herein. The method 400 begins at block 405, where a data management system receives one or more data records for evaluation. At block 410, the data management system evaluates the received records to determine match statuses between the records. In one embodiment, this includes comparing the newly-received records to each other to determine which record(s) should be matched. In some embodiments, the data management system further compares the newly-received records to previously-received and/or evaluated records, to determine whether the new records should be linked to any existing records.

In an embodiment, as discussed above, the data management system evaluates the records by, for each pair of records, generating a feature vector describing differences between the records along any number of dimensions. The data management system can then process the feature vector with one or more trained ML models to generate a classification indicating whether the records are "matched" or "unmatched." In some embodiments, the data management system can further classify the records as requiring additional review (e.g., by a human user). In such an embodiment, these record pairs can be flagged for subsequent user review. Once the data management system has enumerated and evaluated all possible pairs, the method 400 continues to block 415.

At block 415, the data management system links the records that have been classified as "matching." In one embodiment, this includes associating each record with a link or other indication to the other records that are matched with it. In some embodiments, the data management system adds the data included in each matching record to a single aggregated record. In various embodiments, any other suitable association can be performed. By connecting the matching records, the data management system enables the data to be reviewed more completely. For example, subsequent systems that process user data can more-readily and more-confidently access all of the relevant information for a given user, without needing to parse disparate data sources or records.

The method 400 then continues to block 420. At block 420, the data management system determines whether the models should be refined. In one embodiment, this includes checking whether a scheduled training iteration is due. For example, a user may specify to periodically refine the models, or may request an update based on determining that the model is no longer accurate. In this way, the refinement and training of the model can be an iterative and ongoing process. For example, an "optimal" model may simply be one that is "good enough" for now. The training iterations can proceed at the user's desired pace. For example, in embodiments, the iterations can be relatively rapid (e.g., on the order of days) or longer term (e.g., weeks to months) based on the user's training requirements and/or availability.

If the model is to be further refined, the method 400 proceeds to block 335 of FIG. 3. That is, data pairs can be selected and evaluated by the user(s), in order to further refine the model. In no additional training is due, the method 400 returns to block 405. In this way, the system can continuously receive new data records, and evaluate them to be integrated into an aggregate system that accurately links matching data based on the identity of the underlying individual(s), or based on any other suitable matching criteria.

Figure 5:
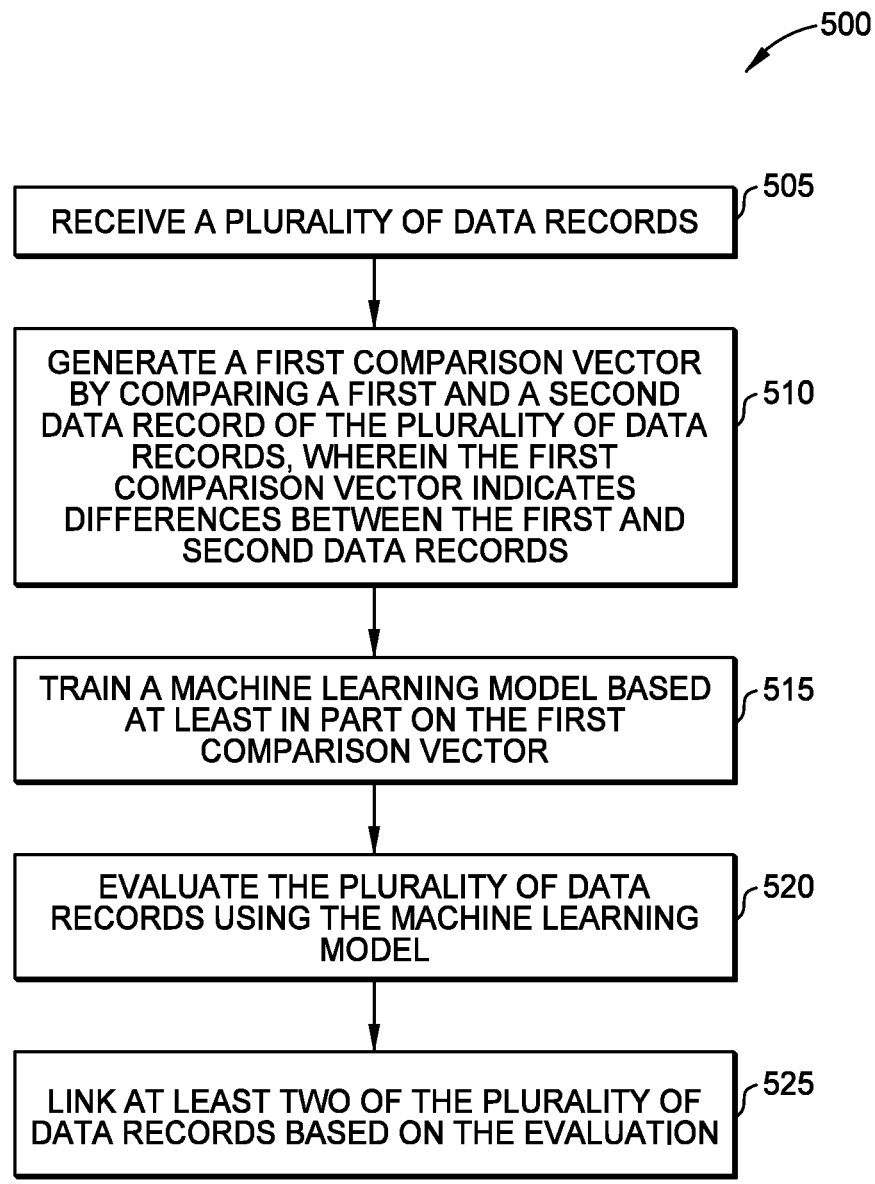
FIG. 5 is a flow diagram illustrating a method for evaluating match data records to identify matching records, according to one embodiment disclosed herein.

FIG. 5 is a flow diagram illustrating a method 500 for evaluating match data records to identify matching records, according to one embodiment disclosed herein. The method 500 begins at block 505, where a data management system receives a plurality of data records. At block 510, the data management system generates a first comparison vector by comparing a first and a second data record of the plurality of data records, wherein the first comparison vector indicates differences between the first and second data records. The method 500 then continues to block 515, where the data management system trains a machine learning model based at least in part on the first comparison vector. Further, at block 520, the data management system evaluates the plurality of data records using the machine learning model. Based on this evaluation, at block 525, the data management system links at least two of the plurality of data records.

Figure 6:
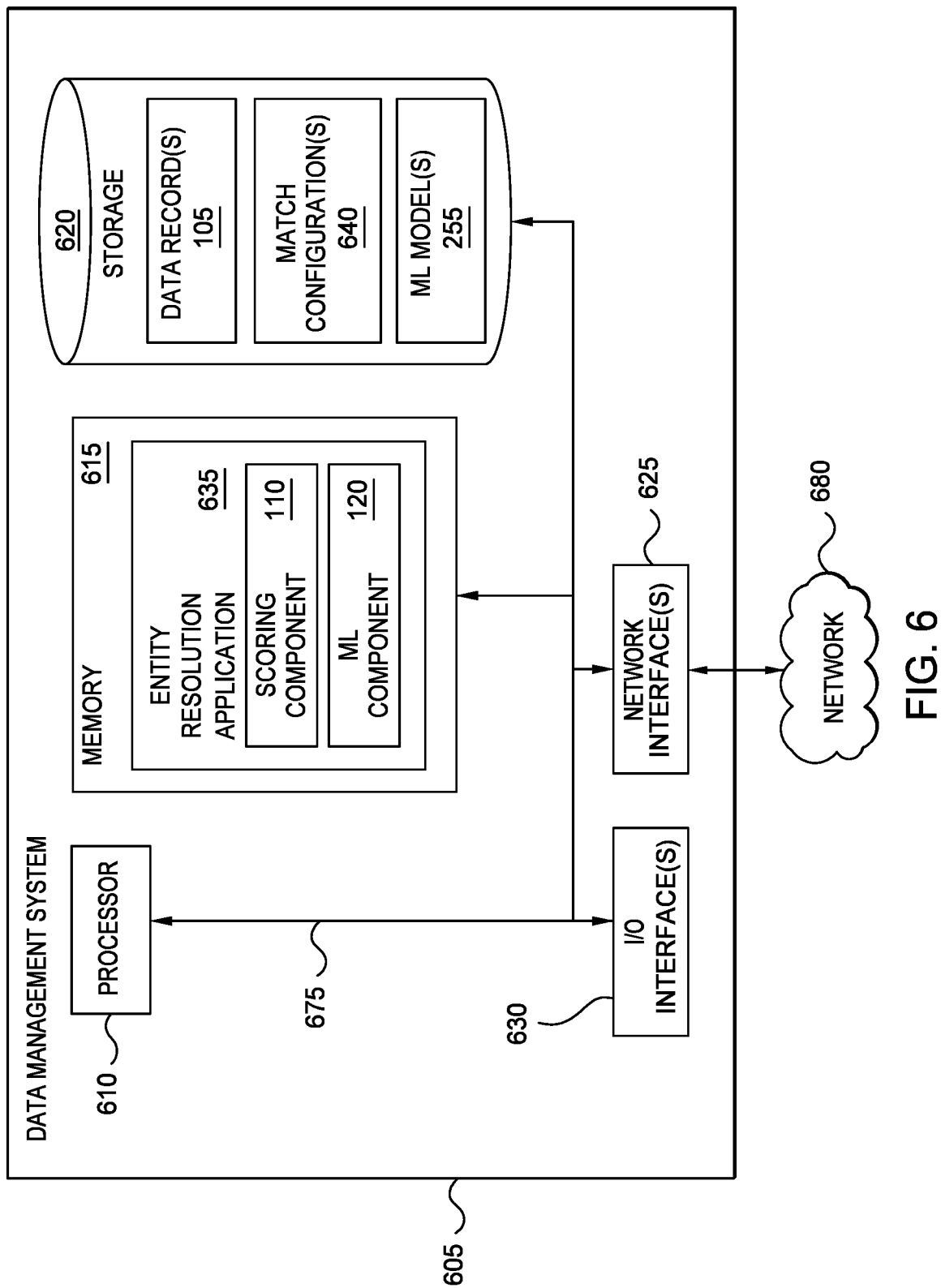
FIG. 6 is a block diagram illustrating a data management system configured to use machine learning to improve entity resolution, according to one embodiment disclosed herein.

FIG. 6 is a block diagram illustrating a Data Management System 605 configured to use machine learning to improve entity resolution, according to one embodiment disclosed herein. Although depicted as a physical device, in embodiments, the Data Management System 605 may be implemented as a virtual device or service, and/or across a number of devices (e.g., in a cloud environment). As illustrated, the Data Management System 605 includes a Processor 610, Memory 615, Storage 620, a Network Interface 625, and one or more I/O Interfaces 630. In the illustrated embodiment, the Processor 610 retrieves and executes programming instructions stored in Memory 615, as well as stores and retrieves application data residing in Storage 620. The Processor 610 is generally representative of a single CPU and/or GPU, multiple CPUs and/or GPUs, a single CPU and/or GPU having multiple processing cores, and the like. The Memory 615 is generally included to be representative of a random access memory. Storage 620 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 630. Further, via the Network Interface 625, the Data Management System 605 can be communicatively coupled with one or more other devices and components (e.g., via the Network 680, which may include the Internet, local network(s), and the like). Additionally, the Network 680 may include wired connections, wireless connections, or a combination of wired and wireless connections. As illustrated, the Processor 610, Memory 615, Storage 620, Network Interface(s) 625, and I/O Interface(s) 630 are communicatively coupled by one or more Buses 675.

In the illustrated embodiment, the Storage 620 includes a set of Data Record(s) 105, Match Configuration(s) 640, and ML Model(s) 225. Although depicted as residing in Storage 620, in embodiments, the Data Record(s) 105, Match Configuration(s) 640, and ML Model(s) 225 can reside in any suitable location. In embodiments, the Data Record(s) 105 include a variety of information relating to any number of entities (e.g., users or individuals), and are collected from any number and type of disparate data sources. In some embodiments, the Data Records 105 include links, connections, pointers, or other associations indicating the relatedness of the records. For example, each respective Data Record 105 can include zero or more indications of other Data Records 105 which the respective Data Record 105 matches or corresponds to (e.g., because they each include information about the same entity). In at least one embodiment, the Data Records 105 include some aggregated records that are created by collecting, combining, or otherwise aggregating the information included in matching records to create a single aggregate record including the available information for the relevant entity. When new records are received, they can be compared to the other newly-received records, and/or to the previously-received and stored Data Records 105.

In an embodiment, the Match Configuration(s) 640 are weights and parameters used to drive a probability matching engine/algorithm. In one embodiment, the Match Configurations 640 are default parameters used to generate a match score, as discussed above. In some embodiments, the Match Configurations 640 can be tweaked or modified (e.g., using the ML Model(s) 225) to improve the accuracy of the scoring system. In embodiments, the ML Model(s) 225 are trained using the Data Records 105 (e.g., using comparison feature vectors for pairs or sets of records) to improve identification of related records.

As illustrated, the Memory 615 includes an Entity Resolution Application 635. The Entity Resolution Application 635 is generally configured to evaluate records to resolve entities reflected in them, by identifying and connecting Data Records 105 that correspond to the same entity, using the techniques described in the present disclosure. For example, the Entity Resolution Application 635 can identify Data Records 105 that pertain to the same patient or other individual, and link them so that all of the information for the individual can be readily-identified. Although depicted as software residing in Memory 615, in embodiments, the functionality of the Entity Resolution Application 635 can be implemented using hardware, software, or a combination of hardware and software. In the illustrated embodiment, the Entity Resolution Application 635 includes a Scoring Component 110 and an ML Component 120. Although depicted as discrete components for conceptual clarity, in embodiments, the operations of the Scoring Component 110 and ML Component 120 may be combined or distributed across any number of components.

As discussed above, the Scoring Component 110 generally evaluates pairs of Data Records 105 to generate feature vectors (also referred to as comparison vectors) that reflect the substantive differences between the records. In some embodiments, the Scoring Component 110 and an ML Component 120 also uses the Match Configurations 640 to generate one or more comparison scores for each pair of Data Records 105. Further, as discussed above, the ML Component 120 generally uses the generated feature vectors, scores, and/or match labels to train the ML Models 225. The models can then be used to evaluate and compare newly-received Data Records 105, in order to match them more accurately and efficiently.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Entity Resolution Application 635) or related data available in the cloud. For example, the Entity Resolution Application 635 could execute on a computing system in the cloud and use machine learning to evaluate data records. In such a case, the Entity Resolution Application 635 could train and refine ML models, and store the models, configurations, and/or records at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
  receiving a plurality of data records;
  generating a first comparison vector by comparing a first and a second data records of the plurality of data records, wherein the first and second data records comprise values for a plurality of attributes related to an entity, wherein the first comparison vector indicates differences between the first and second data records in the plurality of attributes;
  generating, by a probabilistic matching engine, a matching score based at least in part on the first comparison vector;
  training a machine learning (ML) model based at least in part on the first comparison vector and the matching score, wherein the training the ML model comprises:
    determining a match status of the first and second data records based at least in part on comparing the matching score with a threshold,
    training the machine learning model using the first comparison vector as input and the match status as target output, and
    upon determining that accuracy of the machine learning model satisfies one or more accuracy criteria, deploying the machine learning model;
  evaluating, based on one or more generated comparison vectors, the plurality of data records using the trained machine learning model; and
  linking at least two data records of the plurality of data records based on the evaluation.

2. The method of claim 1, the method further comprising:
  generating a second comparison vector by comparing third and fourth data records of the plurality of data records;

labeling the third and fourth data records as not matching, based on evaluating the second comparison vector using trained the machine learning model;
receiving an indication that the third and fourth data records are matching; and
refining the trained machine learning model based on the indication.

3. The method of claim 1, the method further comprising:
generating a second comparison vector by comparing third and fourth data records of the plurality of data records;
labeling the third and fourth data records as matching, based on evaluating the second comparison vector using the trained machine learning model;
receiving an indication that the third and fourth data records are not matching; and
refining the trained machine learning model based on the indication.

4. The method of claim 3, the method further comprising:
determining that the third and fourth data records represent a false positive;
evaluating the second comparison vector to identify a feature pattern indicative of the false positive; and
evaluating a set of matching records using the identified feature pattern.

5. The method of claim 1, wherein the plurality of attributes includes at least one of:
(i) a name of a corresponding person;
(ii) a numeric identifier of the corresponding person;
(iii) a date of birth of the corresponding person;
(iv) an email address of the corresponding person;
(v) a mailing address of the corresponding person; or
(vi) a phone number of the corresponding person.

6. The method of claim 1, the method further comprising:
providing a subset of the plurality of data records for manual review;
iteratively refining the trained machine learning model based on the manual review; and
upon determining that the trained machine learning model is sufficiently accurate, deploying the trained machine learning model.

7. The method of claim 1, wherein generating the first comparison vector comprises:
identifying differences between the first and second data records;
generating one or more scores based on the identified differences using a predefined default configuration; and
aggregating the identified differences and the one or more scores.

8. The method of claim 7, wherein the training the machine learning model based at least in part on the first comparison vector further comprises:
determining a match status of the first and second data records; and
training the machine learning model based further on the match status.

9. A computer program product comprising one or more computer-readable storage media collectively containing computer-readable program code that, when executed by operation of one or more computer processors, performs an operation comprising:
receiving a plurality of data records;
generating a first comparison vector by comparing a first and a second data records of the plurality of data records, wherein the first and second data records comprise values for a plurality of attributes related to an entity, wherein the first comparison vector indicates differences between the first and second data records in the plurality of attributes;
generating, by a probabilistic matching engine, a matching score based at least in part on the first comparison vector;
training a machine learning (ML) model based at least in part on the first comparison vector and the matching score, wherein the training the ML model comprises:
determining a match status of the first and second data records based at least in part on comparing the matching score with a threshold,
training the machine learning model using the first comparison vector as input and the match status as target output, and
upon determining that accuracy of the machine learning model satisfies one or more accuracy criteria, deploying the machine learning model;
evaluating, based on one or more generate comparison vectors, the plurality of data records using the trained machine learning model; and
linking at least two data records of the plurality of data records based on the evaluation.

10. The computer program product of claim 9, the operation further comprising:
generating a second comparison vector by comparing third and fourth data records of the plurality of data records;
labeling the third and fourth data records as matching, based on evaluating the second comparison vector using the trained machine learning model;
receiving an indication that the third and fourth data records are not matching; and
refining the trained machine learning model based on the indication.

11. The computer program product of claim 10, the operation further comprising:
determining that the third and fourth data records represent a false positive;
evaluating the second comparison vector to identify a feature pattern indicative of the false positive; and
evaluating a set of matching records using the identified feature pattern.

12. The computer program product of claim 9, wherein the plurality of attributes includes at least one of:
(i) a name of a corresponding person;
(ii) a numeric identifier of the corresponding person;
(iii) a date of birth of the corresponding person;
(iv) an email address of the corresponding person;
(v) a mailing address of the corresponding person; or
(vi) a phone number of the corresponding person.

13. The computer program product of claim 9, wherein generating the first comparison vector comprises:
identifying differences between the first and second data records;
generating one or more scores based on the identified differences using a predefined default configuration; and
aggregating the identified differences and the one or more scores.

14. The computer program product of claim 13, wherein the training the machine learning model based at least in part on the first comparison vector further comprises:
determining a match status of the first and second data records; and
training the machine learning model based further on the match status.

15. A system comprising:
one or more computer processors; and
one or more memories collectively containing one or more programs which when executed by the one or more computer processors performs an operation, the operation comprising:
receiving a plurality of data records;
generating a first comparison vector by comparing a first and a second data records of the plurality of data records, wherein the first and second data records comprise values for a plurality of attributes related to an entity, wherein the first comparison vector indicates differences between the first and second data records in the plurality of attributes;
generating, by a probabilistic matching engine, a matching score based at least in part on the first comparison vector;
training a machine learning (ML) model based at least in part on the first comparison vector and the matching score, wherein the training the ML model comprises:
determining a match status of the first and second data records based at least in part on comparing the matching score with a threshold, and
training the machine learning model using the first comparison vector as input and the match status as target output, and
upon determining that accuracy of the machine learning model satisfies one or more accuracy criteria, deploying the machine learning model;
evaluating, based on one or more generated comparison vector, the plurality of data records using the trained machine learning model; and
linking at least two data records of the plurality of data records based on the evaluation.

16. The system of claim 15, the operation further comprising:
generating a second comparison vector by comparing third and fourth data records of the plurality of data records;
labeling the third and fourth data records as matching, based on evaluating the second comparison vector using the trained machine learning model;
receiving an indication that the third and fourth data records are not matching; and
refining the trained machine learning model based on the indication.

17. The system of claim 16, the operation further comprising:
determining that the third and fourth data records represent a false positive;
evaluating the second comparison vector to identify a feature pattern indicative of the false positive; and
evaluating a set of matching records using the identified feature pattern.

18. The system of claim 15, wherein the plurality of attributes includes at least one of:
(i) a name of a corresponding person;
(ii) a numeric identifier of the corresponding person;
(iii) a date of birth of the corresponding person;
(iv) an email address of the corresponding person;
(v) a mailing address of the corresponding person; or
(vi) a phone number of the corresponding person.

19. The system of claim 15, wherein generating the first comparison vector comprises:
identifying differences between the first and second data records;
generating one or more scores based on the identified differences using a predefined default configuration; and
aggregating the identified differences and the one or more scores.

20. The system of claim 19, wherein the training the machine learning model based at least in part on the first comparison vector further comprises:
determining a match status of the first and second data records; and
training the machine learning model based further on the match status.

* * * * *